(12) United States Patent
Nobutaka

(10) Patent No.: US 11,181,294 B2
(45) Date of Patent: Nov. 23, 2021

(54) AIR CONDITIONING APPARATUS

(71) Applicant: SEIBU GIKEN CO., LTD., Fukuoka (JP)

(72) Inventor: Nakahama Nobutaka, Fukuoka (JP)

(73) Assignee: SEIBU GIKEN CO., LTD., Fukuoka (JP)

( * ) Notice: Subject to any disclaimer, the term of this patent is extended or adjusted under 35 U.S.C. 154(b) by 243 days.

(21) Appl. No.: 16/389,468

(22) Filed: Apr. 19, 2019

(65) Prior Publication Data
US 2020/0025410 A1    Jan. 23, 2020

(30) Foreign Application Priority Data

Jul. 19, 2018   (JP) .............................. JP2018-135653

(51) Int. Cl.
| | | |
|---|---|---|
| *F24F 12/00* | (2006.01) | |
| *F24F 3/147* | (2006.01) | |
| *F24F 3/14* | (2006.01) | |

(52) U.S. Cl.
CPC ............ *F24F 12/003* (2013.01); *F24F 3/147* (2013.01); *F24F 3/1423* (2013.01); *F24F 2203/104* (2013.01); *F24F 2203/1032* (2013.01)

(58) Field of Classification Search
CPC ........ F24F 3/1423; F24F 3/147; F24F 12/003; F24F 2203/1032; F24F 2203/104; F24F 2203/1016; F24F 2203/1072; F24F 12/001
See application file for complete search history.

(56) References Cited

U.S. PATENT DOCUMENTS

| | | | | |
|---|---|---|---|---|
| 9,920,960 B2* | 3/2018 | Gerber | ...................... | F24D 5/12 |
| 2010/0170273 A1* | 7/2010 | Morimoto | ............ | B01D 53/265 |
| | | | | 62/176.6 |
| 2010/0307175 A1* | 12/2010 | Teige | .................... | F24F 3/1423 |
| | | | | 62/94 |
| 2011/0289955 A1* | 12/2011 | Okano | .................. | F24F 3/1423 |
| | | | | 62/271 |
| 2012/0085112 A1* | 4/2012 | Wintemute | ............. | F25B 49/02 |
| | | | | 62/150 |
| 2014/0027086 A1* | 1/2014 | Kim | ...................... | F28D 19/041 |
| | | | | 165/6 |
| 2015/0198350 A1* | 7/2015 | Phannavong | ............ | F24F 11/46 |
| | | | | 62/89 |
| 2017/0356661 A1* | 12/2017 | Fischer | ................... | F24F 3/147 |

FOREIGN PATENT DOCUMENTS

JP          2010-54184         3/2010

* cited by examiner

*Primary Examiner* — Joseph F Trpisovsky
(74) *Attorney, Agent, or Firm* — Staas & Halsey, LLP

(57) ABSTRACT

An air conditioning apparatus saves space, has a low cost and a high energy efficiency. In a former stage, total heat exchange is carried out in a total heat exchange rotor which performs heat exchange between the return air from the indoor space and outdoor air. A passive desiccant rotor, if provided, may eliminate a the need for a regenerative heat source in a latter stage. Latent heat exchange is performed in a heat pump circuit which exchanges heat between the outdoor air and the return air which have undergone total heat exchange. Further, the air conditioning apparatus may realize reduction of the total cost of equipment by eliminating the outdoor unit, and may realize reduction of on-site construction cost after the installation of the equipment and shortening of the construction term.

11 Claims, 4 Drawing Sheets

AIR CONDITIONING APPARATUS

CROSS-REFERENCE TO RELATED APPLICATIONS

This application is based on and hereby claims priority to Japanese Patent Application No. 2018-135653 filed Jul. 19, 2018, the contents of which are hereby incorporated by reference.

BACKGROUND

At least one potential embodiment of the present invention provides an air conditioning apparatus which uses a passive desiccant rotor that utilizes a relative humidity difference of two or more air streams without using a total heat exchanger and an external heat source for regeneration and the apparatus (Hereinafter referred to as "air conditioner") can adjust the temperature and the humidity of the outdoor air with a small energy.

In order to adjust the temperature and the humidity of indoor air, the air conditioners used for business buildings and commercial buildings, etc. are used to adjust appropriately the temperature and humidity of the air supplied to indoor air conditioners, etc., based on the temperature and humidity of the outdoor air.

For example, as such an air conditioner, the air conditioner of Patent Document 1, Japanese Patent Publication No. 2010-54184A, is composed of a total heat exchanger and a desiccant rotor. In this device, total heat exchange is performed between the outdoor air and the return air from the room by the total heat exchanger, and then the outdoor air which has been subjected to the total heat exchange is introduced directly into the total heat exchanger by the air conditioning method. Also, in this device, the return air from the room is previously dehumidified or humidified using a desiccant rotor and then introduced into the total heat exchanger. In addition, since this device utilizes the exhaust heat of the temperature control heat pump as the regeneration heat source of the desiccant rotor, the initial cost and the running cost are suppressed.

SUMMARY

The device disclosed in Patent Document 1, Japanese Patent Publication No. 2010-54184A, is an air conditioner that suppresses the initial cost and the running cost by utilizing the return air RA from the room. However, the air conditioner requires additional cooling by cold water or the like in summer and additional heating by hot water or the like in winter as well in order to achieve the same air supply SA condition as the indoor condition.

Further, in the case of general fan coil units and total heat exchangers, the initial cost is inexpensive. However, as problems, additional temperature control devices such as overcooling in the summer and reheating in the winter are necessary and the devices increases the running cost.

The inventor aims to provide an air conditioner having a passive desiccant rotor which eliminates the need for a total heat exchanger and a regeneration heat source so that the air conditioner covers cooling and heating only by a heat pump system.

In order to solve the above-mentioned problems, one important characteristic of the air conditioner proposed in this document is that total heat exchange is performed by a total heat exchange rotor which performs heat exchange between return air from the indoor space and outdoor air in a former stage. A passive desiccant rotor which does not require a regeneration heat source may be provided in a later stage. Latent heat exchange is performed in the heat exchangers of a heat pump circuit, on the total heat-exchanged outdoor air and return air.

Since the air conditioner proposed by the inventor is constructed as described above, it can cover all cooling and heating only by the heat pump system. In addition, since the present air conditioner incorporates all the refrigerant devices inside the machine, an outdoor unit is unnecessary. Therefore, the present air conditioner also eliminates the need for on-site work such as refrigerant piping and external wiring. Further, the present air conditioner can reduce the construction cost and shorten the construction period. In addition, the present air conditioner does not require a regenerative heat source of the desiccant rotor and does not heat regenerate the return air RA. Therefore, the present air conditioner can be used for exchanging heat with the outdoor air OA without exhausting the return air to the outside of the present air conditioner even after the return air RA is regenerated at room temperature, resulting in energy saving. Further, in the present air conditioner, by loading an ion exchange resin as the adsorbent of the passive desiccant rotor, even when regenerated at room temperature, there is no shift to the supply of odor contained in the return air.

The inventor proposes an air conditioner, and one characteristic is that the air conditioner has an exhaust passage for exhausting return air from an indoor space to the outside, a supply passage for supplying outdoor air to the indoor space in a former stage, a total heat exchange rotor for conducting total heat exchange between the return air in the exhaust passage and the outdoor air in the air supply passage, a heat pump circuit for exchanging heat between the supply air from the total heat exchange rotor and the return air, and a desiccant rotor in latter stage.

During cooling in summer, outdoor air is cooled by using the heat exchanger of the heat pump circuit on the air supply side as an evaporator, and the heat exchanger on the return air side is operated as a condenser. When heating in winter, outdoor air is heated with the heat exchanger of the heat pump on the supply side as a condenser, and the heat exchanger on the return air side is operated as an evaporator. Also, the passive desiccant rotor dehumidifies additionally in summer. As described above, by the heat pump technique, in addition to the switching control between the dehumidifying cooling operation in the summer season and the heating operation in the winter season, the passive desiccant rotor additionally dehumidifies in the summer season. Moreover, by installing the total heat exchanger, it is also possible to suppress the energy consumption by recovering the energy of the return air discharged from the indoor space. Furthermore, due to this recovery, the running cost of the present air conditioner can be greatly reduced.

The inventor proposes an air conditioning apparatus having an exhaust passage, an air supply passage, a total heat exchange rotor, a heat pump circuit and a desiccant rotor. The exhaust passage exhausts return air from an indoor space to an outside location. The air supply passage receives outdoor air and to supply the outdoor air to the indoor space as supply air. The total heat exchange rotor performs total heat exchange between the return air in said exhaust passage and the outdoor air in said air supply passage. The total heat exchange rotor is provided in a former stage. The total heat exchange rotor produces the supply air from the outdoor air. The heat pump circuit exchanges heat between the return air and the supply air produced by said total heat exchange rotor. The desiccant rotor processes the return air and the supply air. The desiccant rotor is provided at a later stage with respect to the total heat exchange rotor such that the desiccant rotor receives the supply air from the total heat exchange rotor before the supply air is supplied to the indoor space, and such that desiccant rotor receives the return air from the indoor space before the return air is supplied to the total heat exchange rotor.

The heat pump circuit has first and second heat exchangers. The first heat exchanger is positioned to receive return air from the total heat exchange rotor before the return air is exhausted to the outside location. The second heat exchanger is positioned to receive the supply air produced by the total heat exchange rotor before the supply air is supplied to the desiccant rotor.

BRIEF DESCRIPTION OF THE DRAWINGS

These and or/other aspects and advantages will become apparent and more readily appreciated from the following description of the embodiments, taken in conjunction with the accompanying drawings of which.

DETAILED DESCRIPTION OF THE PREFERRED EMBODIMENTS

Figure 1:
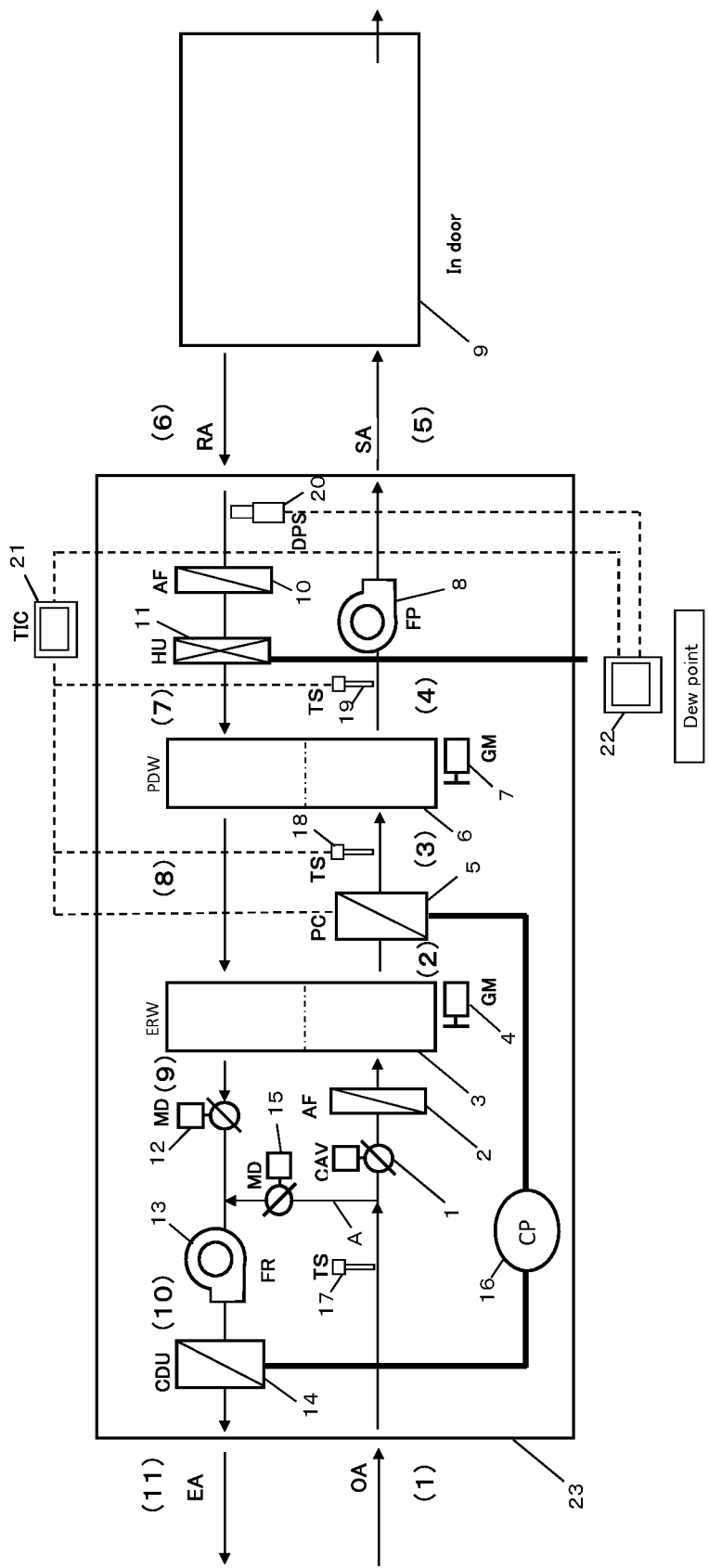
FIG. 1 shows a diagram of preferred embodiment of the air conditioner proposed by the inventor.

Reference will now be made in detail to the embodiments, examples of which are illustrated in the accompanying drawings, wherein like reference numerals refer to the like elements throughout. The embodiments are described below to explain the present invention by referring to the figures.

Hereinafter, the embodiments of the proposed air conditioner will be described in detail with reference to the drawings. Reference numeral 3 denotes a total heat exchanger rotor in which a sheet such as an aluminum foil is corrugated to form a rotor and an adsorbent such as silica gel or ion exchange resin which adsorbs moisture is carried.

The total heat exchange rotor 3 is disposed across an exhaust passage for exhausting the return air RA from the indoor space 9 as an exhaust EA and a supply passage for supplying the outdoor air OA as the supply air SA to the indoor space 9, and is rotated by the gear motor 4. Heat exchangers 5, 14 such as a heat exchange coil of a heat pump circuit and a compressor (compressor) 16 perform heat exchange between the return air passing through the total heat exchange rotor 3 and the supply air. In addition, the bypass path A is provided to stabilize the heat pump circuit, so that the outdoor air OA can be directly sent to the exhaust EA side by the air volume adjusting device 15 such as a motor damper.

Reference numeral 6 is a passive desiccant rotor which is obtained by corrugating (poring) a porous sheet of inorganic fibers such as glass fibers to form a rotor and carrying an adsorbent such as silica gel, zeolite and ion exchange resin which adsorb moisture. In this embodiment, an ion exchange resin is used so as not to shift odor between return air and supplied air.

The passive desiccant rotor 6 is disposed across an exhaust passage for exhausting the return air RA from the indoor space 9 as an exhaust EA and an air supply passage for supplying the outdoor air OA as the supply air SA to the indoor space 9. Further, this rotor is rotated by the gear motor 7. Reference number 11 denotes a humidifier such as a dropping permeation type, and humidifies when the indoor space such as in winter is excessively dried.

First, the cooling operation in summer will be explained as follows. The outdoor air OA is sent to the total heat exchange rotor 3 by the blower 8 as a processing fan through the air volume adjustment device 1 such as a constant air flow rate device and a motor damper and the air filter 2. In the total heat exchange rotor 3, the outdoor air having passed through the air filter is totally heat exchanged with the return air passing through the passive desiccant rotor 6 from the indoor space 9. The outdoor air OA subjected to the total heat exchange is sent to a heat exchanger 5 (a cooling coil or the like) as an evaporator of a heat pump circuit and cooled. The air that has passed through the heat exchanger 5 is sent to the passive desiccant rotor 6 to be dehumidified and supplied to the interior space 9 as an air supply SA. The return air RA from the indoor space 9 is sent to the passive desiccant rotor 6 by the blower 13 as a regenerating fan so as to be humidified and to be cooled. The return air RA that has passed through the passive desiccant rotor 6 is sent to the total heat exchange rotor 3 and is totally heat exchanged with the outdoor air OA. An air volume adjusting device 12 is provided between the total heat exchange rotor 3 and the blower 13 as shown in the drawings. The air having passed through the total heat exchange rotor 3 is sent to a heat exchanger 14 as a condenser of a heat pump circuit and then exhausted outside the air conditioner as an exhaust EA. The temperature of the heat exchanger 5 and the temperature sensors 18 and 19 is measured by the temperature controller 21 and the dew point of the return air RA is measured by the dew point sensor 20 so that the dew point of the return air is controlled by the dew point control device 22. A temperature sensor 17 is also provided for the outdoor air OA as shown in the drawings.

Figure 2:
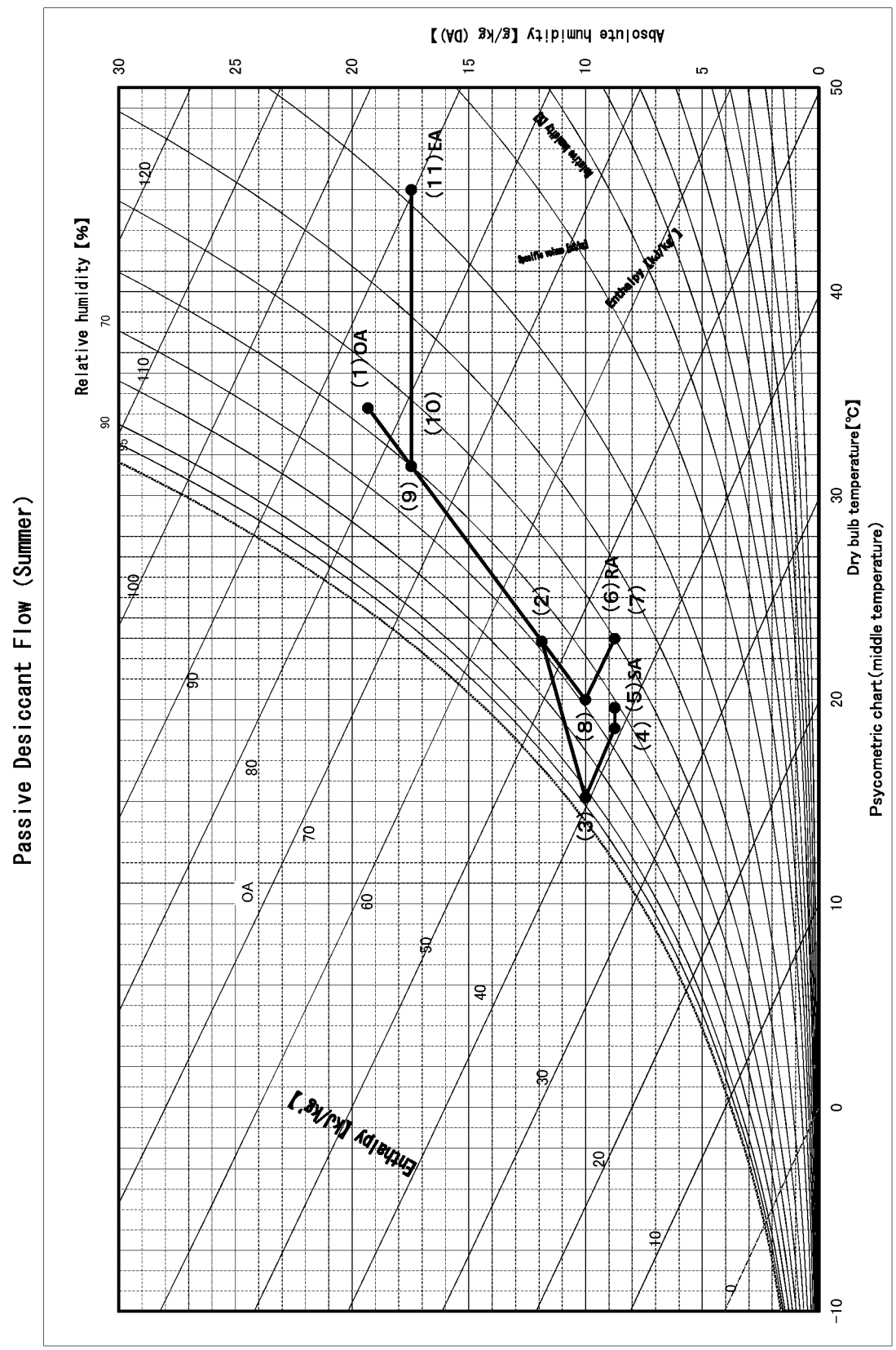
FIG. 2 shows an air diagram at the time of summer operation by the proposed air conditioner.

The state of air inside and outside of the apparatus of the air conditioner 23 in the summer season is shown in the pneumatic diagram of FIG. 2. FIG. 2 shows the state of air at places (1) through (11) inside and outside the apparatus of FIG. 1.

Next, the cooling operation in winter will be explained as follows. The outdoor air OA is sent to the total heat exchange rotor 3 by a blower 8 as a processing fan through the air volume adjustment device 1 such as a constant air flow rate device and an air filter 2. The air OA sent to the total heat exchange rotor 3 is totally heat exchanged with the return air passing from the indoor space 9 through the passive desiccant rotor 6 by the total heat exchange rotor 3. The total heat exchanged outdoor air OA is sent to a heat exchanger 5 (a heating coil or the like) as a condenser of a heat pump circuit and heated. The air having passed through the heat exchanger 5 is sent to the passive desiccant rotor 6 to be humidified and supplied to the interior space 9 as an air supply SA. The return air RA from the indoor space 9 is sent to the passive desiccant rotor 6 and dehumidified by the blower 13 as a regenerating fan. When the air in the indoor space 9 is excessively dry, the passive desiccant rotor 6 is humidified by the humidifier 11 so that the humidity of the air supply SA is adjusted to rise. An air filter 10 receives return air RA and is provided upstream from the humidifier 11 as shown in the drawings. The return air RA that has passed through the passive desiccant rotor 6 is sent to the total heat exchange rotor 3 and is totally heat exchanged with the outdoor air OA. The air having passed through the total heat exchange rotor 3 is sent to a heat exchanger 14 as an evaporator of a heat pump circuit and then exhausted outside the apparatus as an exhaust EA.

Figure 3:
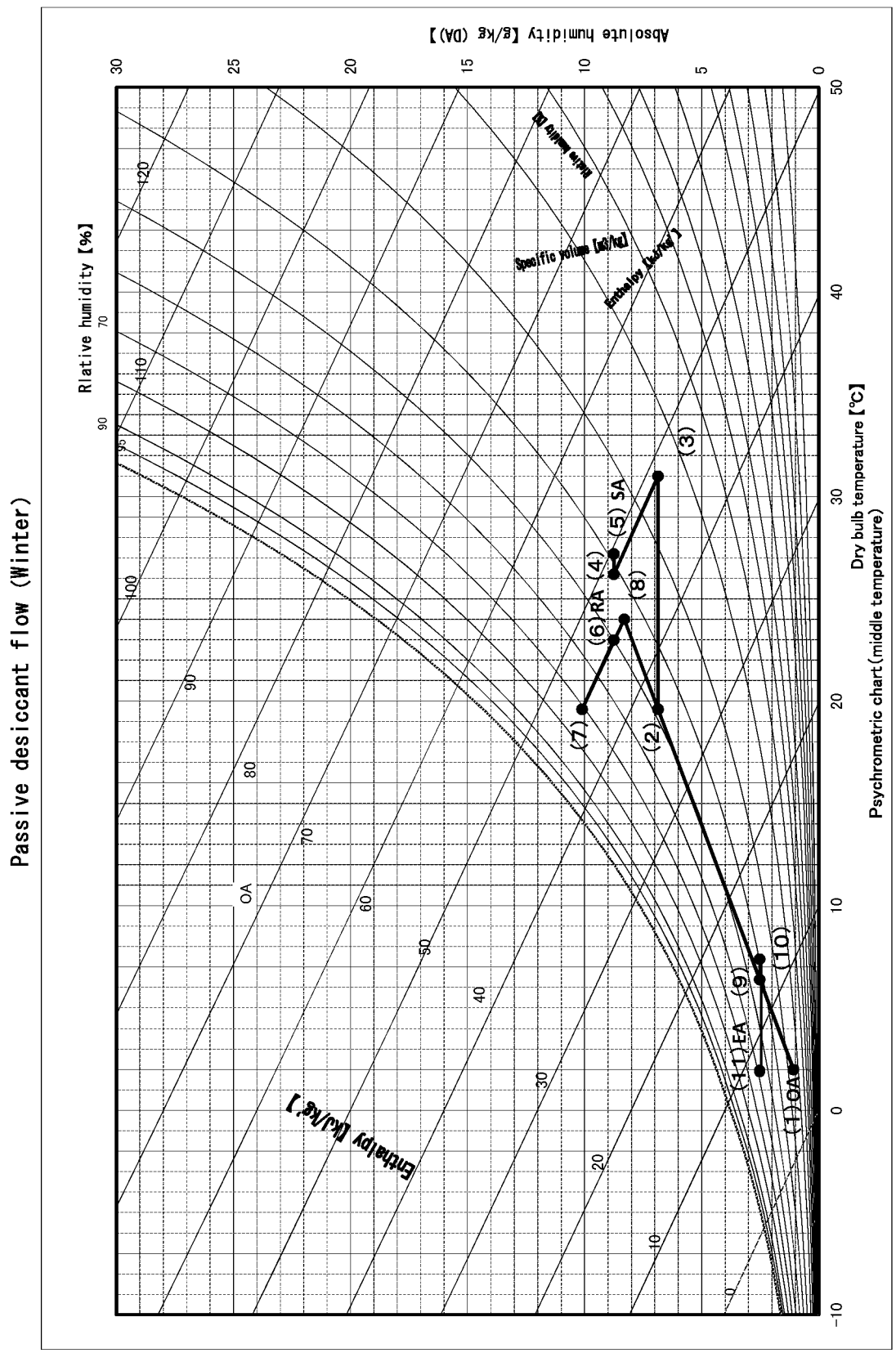
FIG. 3 shows an air diagram at the time of winter operation by the proposed air conditioner.

The state of air inside and outside of the apparatus of the air conditioner 23 in winter is shown in the pneumatic diagram of FIG. 3. FIG. 3 also shows the state of air at places (1) to (11) inside and outside the apparatus of FIG. 1. The temperatures of (6) of the return air RA and (5) of the supply air SA are almost the same, and additional heating by hot water or the like is unnecessary.

Figure 4:
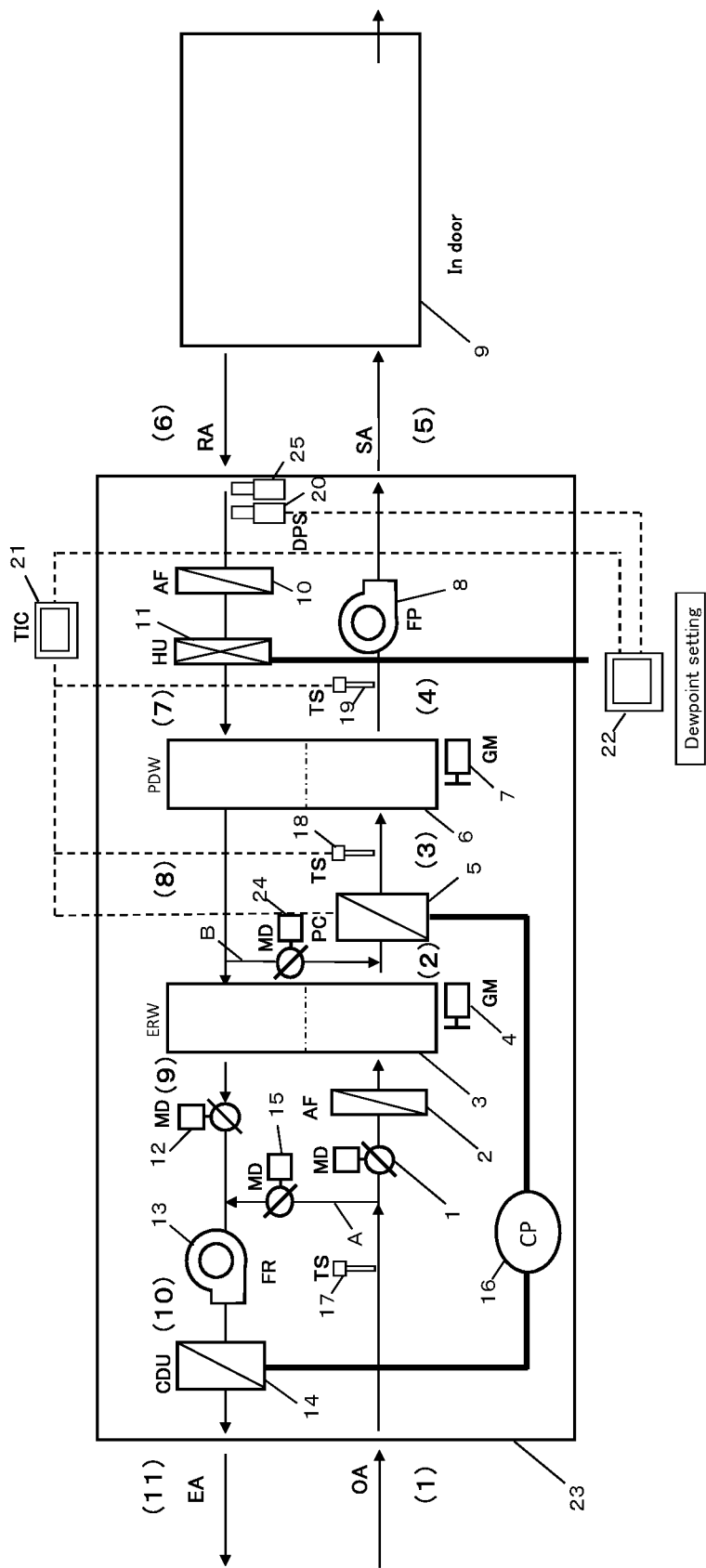
FIG. 4 shows a diagram of another preferred embodiment of the proposed air conditioner.

As other embodiment, as shown in FIG. 4, a carbon dioxide concentration sensor 25 is installed beside the dew point sensor 20, and in the middle of (8) to (2) in FIG. 4, an air volume adjustment device 24 such as a motor damper is installed in the bypass path B. Furthermore, in this other embodiment, the return air RA may return to the indoor space 9 within the range where the concentration of the indoor carbon dioxide, which is said to be generally inferior in intelligent productivity efficiency, does not exceed 1000 ppm. In this case, the air flow rate adjusting device 1 is a motor damper. By configuring in this way, the amount of ventilation between the air in the indoor space and the outdoor air can be suppressed, and energy saving can be achieved accordingly. For example, when the concentration of carbon dioxide in the return air RA is low during a holiday or at night, it is possible to operate in a chromer cycle mode in which the amount of air taken in outdoor air is suppressed by the bypass road B.

The inventor proposed an air conditioner that can use all heat exchangers and passive desiccant rotors and can fully cover cooling and heating with only a heat pump circuit. In addition, the proposed air conditioner is capable of reducing the total cost of the device by eliminating the need for an outdoor unit, reducing the on-site construction cost at the time of device installation and shortening the construction term. That is, it is unnecessary to install cold/hot water piping and refrigerant piping at the site where the device is installed, and further, the installation place of the outdoor unit is unnecessary.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. An air conditioning apparatus comprising:
   an exhaust passage to exhaust return air from an indoor space to an outside location;
   an air supply passage to receive outdoor air and to supply the outdoor air to the indoor space as supply air;
   a total heat exchange rotor to perform total heat exchange between the return air in said exhaust passage and the outdoor air in said air supply passage, the total heat exchange rotor being provided in a former stage, the total heat exchange rotor producing the supply air from the outdoor air;
   a heat pump circuit to exchange heat between the return air and the supply air produced by said total heat exchange rotor; and
   a desiccant rotor to process the return air and the supply air, the desiccant rotor being provided at a later stage with respect to the total heat exchange rotor such that the desiccant rotor receives the supply air from the total heat exchange rotor before the supply air is supplied to the indoor space, and such that desiccant rotor receives the return air from the indoor space before the return air is supplied to the total heat exchange rotor, wherein
   the total heat exchange rotor has an exhaust passage outlet where return air exits from the total heat exchange rotor,
   the desiccant rotor has an exhaust passage outlet where return air exits from the desiccant rotor,
   the heat pump circuit has first and second heat exchangers, the first heat exchanger being provided for the exhaust passage and the second heat exchanger being provided for the air supply passage, the first heat exchanger being provided downstream from the exhaust passage outlet of the total heat exchange rotor and downstream from the exhaust passage outlet of the desiccant rotor, and
   the desiccant rotor is a passive element provided without a separate regenerative heat source in the exhaust passage to regenerate the desiccant rotor.

2. The air conditioning apparatus according to claim 1, wherein the desiccant rotor is a passive desiccant rotor carrying an ion exchange resin as an adsorbent.

3. The air conditioning apparatus according claim 1, wherein
   the desiccant rotor has an exhaust path entrance where the return air enters the desiccant rotor, and
   a humidifier is provided between the indoor space and the exhaust path entrance of said desiccant rotor.

4. The air conditioning apparatus according to claim 1, wherein
   outdoor air enters the air conditioning apparatus at an outdoor air inlet, and
   a bypass passage is provided between said exhaust passage and said air supply passage so as to connect the outdoor air inlet with the exhaust passage outlet of said total heat exchange rotor so that outdoor air flows through the first heat exchanger of said heat pump circuit.

5. The air conditioning apparatus according to claim 1, further comprising:
   at least one temperature sensor; and
   a dew point sensor to detect a dew point of the return air from the indoor space, wherein
   the at least one temperature sensor measures temperatures comprising a temperature of the second heat exchanger of said heat pump circuit, a temperature of supply air entering the desiccant rotor, and a temperature of supply air exiting the desiccant rotor, and
   based on the temperatures measured by the at least one temperature sensor and based on the dew point detected by the dew point sensor, a dew point controller controls a dew point of the indoor space.

6. An air conditioning apparatus comprising:
   an exhaust passage to exhaust return air from an indoor space to an outside location;
   an air supply passage to receive outdoor air and to supply the outdoor air to the indoor space as supply air;
   a total heat exchange rotor to perform total heat exchange between the return air in said exhaust passage and the outdoor air in said air supply passage, the total heat exchange rotor being provided in a former stage, the total heat exchange rotor producing the supply air from the outdoor air;
   a heat pump circuit to exchange heat between the return air and the supply air produced by said total heat exchange rotor; and a desiccant rotor to process the return air and the supply air, the desiccant rotor being provided at a later stage with respect to the total heat exchange rotor such that the desiccant rotor receives the supply air from the total heat exchange rotor before the supply air is supplied to the indoor space, and such that desiccant rotor receives the return air from the indoor space before the return air is supplied to the total heat exchange rotor, wherein the heat pump circuit has first and second heat exchangers, the first heat exchanger being provided for the exhaust passage and the second heat exchanger being provided for the air supply passage, the second heat exchanger having an inlet side and an outlet side, the desiccant rotor has an exhaust path outlet where the return air exits the desiccant rotor, a return air passage selectively supplies return air from the exhaust path outlet of the desiccant rotor to the inlet side of the second heat exchanger, a carbon dioxide concentration sensor measures a carbon dioxide concentration of the return air from the indoor space and produces an output, and based on the output from the carbon dioxide concentration sensor, a carbon dioxide controller controls an amount of return air flowing through the return air passage, from the exhaust path outlet of said desiccant rotor to the inlet side of the second heat exchanger.

7. The air conditioning apparatus according to claim 2, wherein the desiccant rotor has an exhaust path entrance where the return air enters the desiccant rotor, and a humidifier is provided between the indoor space and the exhaust path entrance of said desiccant rotor.

8. The air conditioning apparatus according to claim 7, wherein outdoor air enters the air conditioning apparatus at an outdoor air inlet, and a bypass passage is provided between said exhaust passage and said air supply passage so as to connect the outdoor air inlet with the exhaust passage outlet of said total heat exchange rotor so that outdoor air flows through the first heat exchanger of said heat pump circuit.

9. The air conditioning apparatus according to claim 8, further comprising:

at least one temperature sensor; and a dew point sensor to detect a dew point of the return air from the indoor space, wherein the at least one temperature sensor measures temperatures comprising a temperature of the second heat exchanger of said heat pump circuit, a temperature of supply air entering the desiccant rotor, and a temperature of supply air exiting the desiccant rotor, and based on the temperatures measured by the at least one temperature sensor and based on the dew point detected by the dew point sensor, a dew point controller controls a dew point of the indoor space.

10. The air conditioning apparatus according to claim 9, wherein the second heat exchanger of the heat pump circuit has an inlet side and an outlet side, a return air passage selectively supplies return air from the exhaust passage outlet of the desiccant rotor to the inlet side of the second heat exchanger, a carbon dioxide concentration sensor measures a carbon dioxide concentration of the return air from the indoor space and produces an output, and based on the output from the carbon dioxide concentration sensor, a carbon dioxide controller controls an amount of return air flowing through the return air passage, from the exhaust passage outlet of said desiccant rotor to the inlet side of the second heat exchanger.

11. The air conditioning apparatus according to claim 1, wherein the second heat exchanger is positioned to receive the supply air produced by the total heat exchange rotor before the supply air is supplied to the desiccant rotor.

\* \* \* \* \*